April 25, 1950     C. B. McLAUGHLIN ET AL     2,505,623
APPARATUS FOR MANUFACTURE OF HELICAL COILS OF TUBING
Filed July 15, 1948         2 Sheets-Sheet 1
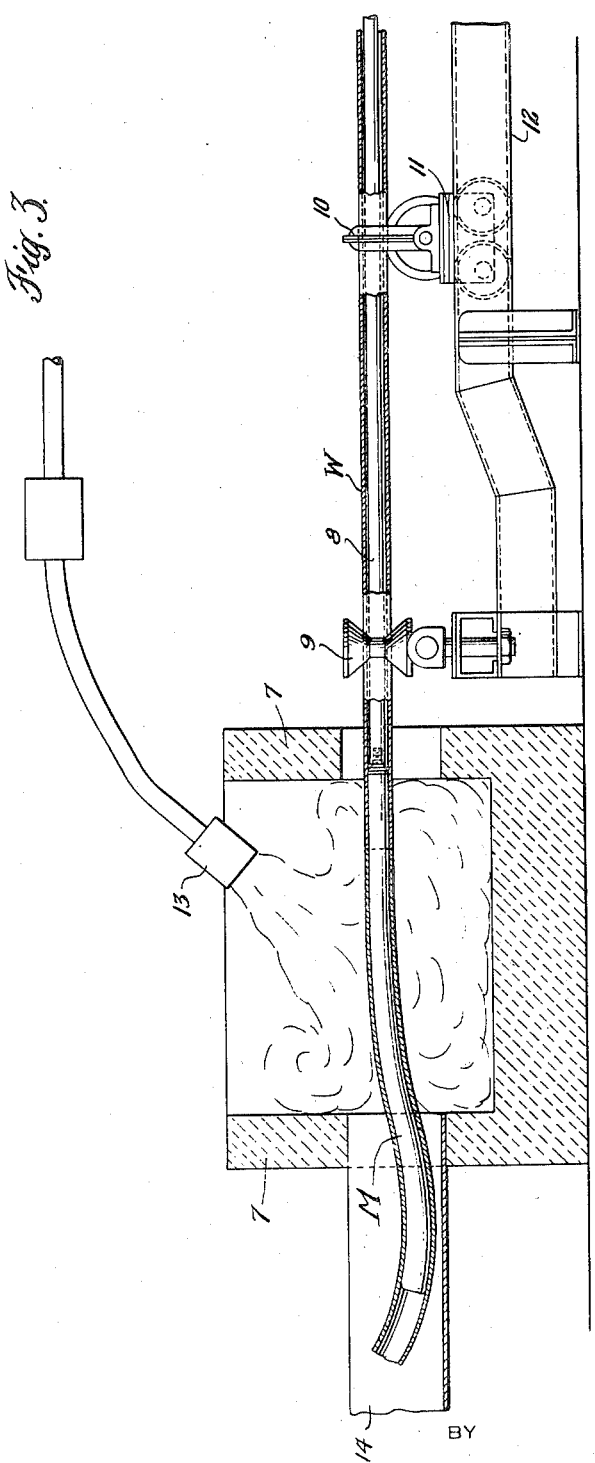
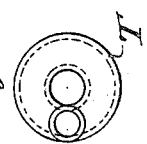
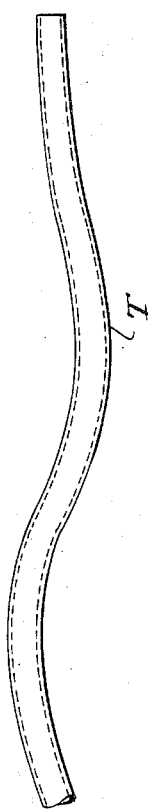
INVENTORS
Carl B. McLaughlin
John D. Ochs
Charles L. Redmon
BY Symestood & Lechner
ATTORNEYS.

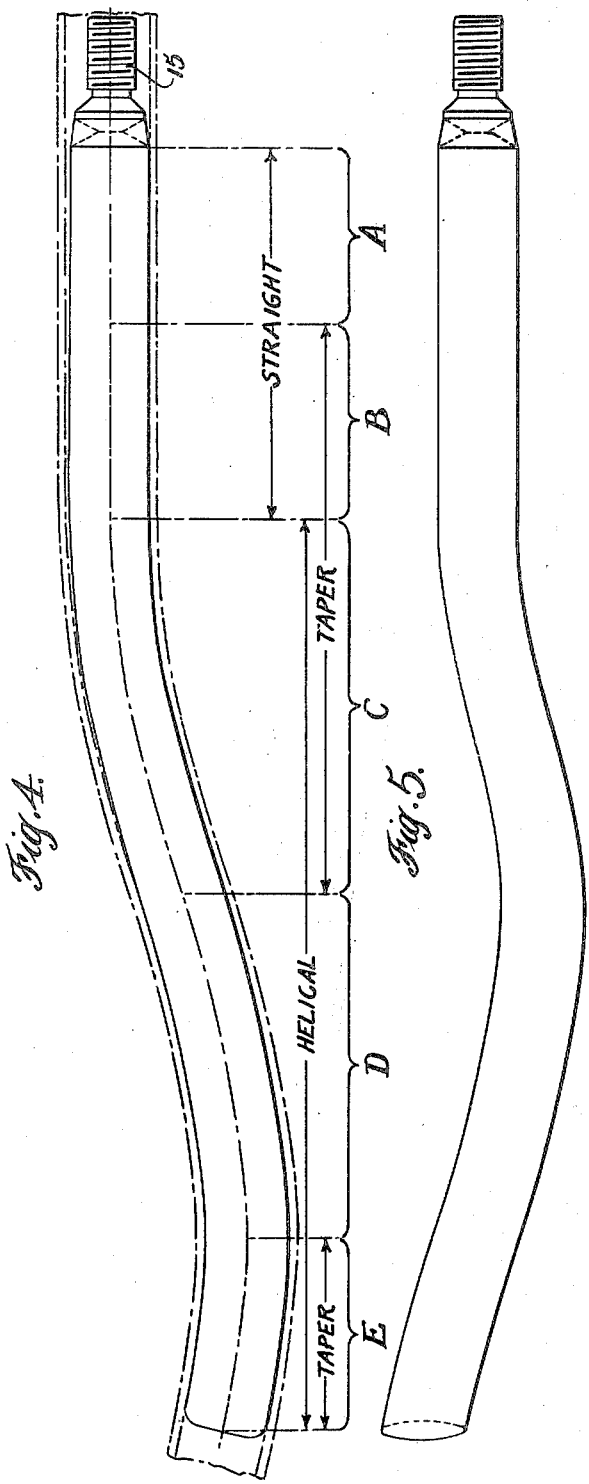

Patented Apr. 25, 1950

2,505,623

UNITED STATES PATENT OFFICE 2,505,623

APPARATUS FOR MANUFACTURE OF HELICAL COILS OF TUBING

Carl B. McLaughlin, John D. Ochs, and Charles L. Redmon, Louisville, Ky., assignors to Tube Turns, Inc., Louisville, Ky., a corporation of Kentucky Application July 15, 1948, Serial No. 38,918

14 Claims. (Cl. 153—64)

This invention relates to novel equipment for manufacture of helical coils of tubing, the invention being particularly concerned with the fabrication of helical coils having a relatively large ratio of pitch to diameter of helix.

Various methods for manufacture of helical coils of tubing are known including, for example, the well known method of forcing straight tubing over a mandrel having the form of a portion of an annulus or ring. In such an operation, the turns of the coil being formed may be deflected toward one side, so that such turns contact or lie close to each other. This results in a compact coil; that is, a coil in which the pitch, or distance between adjacent turns, is relatively small as compared with the diameter of the helix. It has been suggested, for example in U. S. Patent 303,952 to Sharp to produce elongated coils from such compact coils by stretching the compact coil in the direction of its axis. So far as we know this method of producing elongated coils has not been employed commercially.

The technique referred to just above, especially where considerable stretching is relied upon to secure a coil having a relatively large ratio of pitch to diameter, is objectionable for a number of reasons, notably the fact that the tubing is distorted in the stretching, and may even buckle when it is attempted to produce coils having a very large ratio of pitch to diameter.

In accordance with the present invention, a helical coil having a large ratio of pitch to diameter of the helix may readily be formed in a single operation.

The invention, moreover, makes possible the direct or one-step fabrication of helical coils of tubing of great accuracy and uniformity, even in instances where the ratio of pitch to diameter is unusually great. The method and equipment of the invention are of especial advantage and importance in the production of helical coils where the ratio of the pitch to the diameter is at least equal to 2, i. e., where the pitch dimension (the distance from turn to turn of the coil) is at least equal to twice the diameter of the coil. The method and apparatus of the invention are even capable of forming accurate helical coils where the ratio of pitch to diameter approaches infinity, such a coil being one which is only slightly curved from straight form.

Briefly described, the method of the present invention involves the use of a mandrel over which a straight tube is forced, the said mandrel having a portion of true helical form conforming with the helix desired in the finished coil of tubing. Depending on the type of metal constituting the tubing, the wall thickness of the tubing, and the ratio of pitch to diameter of the desired coil, the forming of the coil may be carried out either at ordinary temperatures or at elevated temperatures.

It is here mentioned that a tube formed in accordance with the present invention is of high quality with respect to the original condition of the metal itself in the tube wall, it being noted that by the method of the invention the tube is directly forged to helical form, and is therefore substantially free of locked-in stresses. This is accomplished, moreover, without employment of any special annealing operations, such as may be required to relieve stresses set up as a result of the prior art proposal to stretch a compact coil originally of low ratio of pitch to diameter.

How the foregoing objects and advantages are attained will appear more fully from the following description, referring to the accompanying drawings in which:

Figure 1 is an elevational view of a portion of a helical coil of tubing formed in accordance with the present invention;

Figure 2 is an end view of the coil, taken from the right of Figure 1;

Figure 3 is a somewhat diagrammatic illustration of equipment adapted for use in production of helical coils of tubing according to the present invention;

Figure 4 is an elevational view of a mandrel to be used according to the invention;

Figure 5 is a view of the mandrel shown in Figure 4 but representing the mandrel when viewed as from the bottom of Figure 4; and Figure 6 is an end view of the mandrel taken from the left of Figure 4.

Referring first to Figures 1 and 2, it will there be seen that the helical coil of tubing T has a relatively large pitch as compared with the diameter of the helix. This coil may be formed by the equipment illustrated generally and somewhat diagrammatically in Figure 3. Here it will be seen that a mandrel M is positioned in part within the heating chamber defined by refractory walls 7. An anchoring rod 8 is secured to one end of the mandrel and extends therefrom (toward the right in Figure 3) through the straight tubing W which is being fed to and forced over the mandrel M. The rod 8 is adapted to be anchored to one part of a hydraulic press mechanism of known type, the other part of which is operatively associated with the end of the straight tubing W, and thereby the tubing is forced over the mandrel. The tubing W may be guided by means of pairs of grooved rollers such as indicated at 9 and also by one or more positioning straps 10 carried for example on one or more carriages 11 adapted to ride in a guideway 12 as the tubing is advanced. The anchoring rod 8 is preferably of smaller diameter than the inside diameter of the tubing being fed to the mandrel. The tubing may be heated by any suitable heater mechanism, such as the gas burner 13. The specific type of heater mechanism employed forms no part of the present invention per se, but it is here noted that the heating of the tubing is preferably effected substantially uniformly throughout the circumference of the tubing as it passes through the heating chamber. When forming of the coil is carried out at elevated temperature uniformity of heating is of importance in maintaining uniformity of wall thickness in the tubing of the finished coil.

As the coil leaves the heating chamber it is preferably supported for an appreciable distance, so as to avoid undesired bending of the tubing under the action of gravity, in the region beyond the end of the mandrel. For this purpose a simple 90° angle trough such as indicated at 14 may be employed.

The mandrel itself is shown in Figures 4, 5 and 6. Here it will be seen that at the right hand end, the mandrel is provided with a screw thread attachment element 15 adapted to cooperate with the anchoring rod 8.

In Figure 4 different portions of the mandrel have been bracketed and designated by letters A, B, C, D and E. These various sections of the mandrel are shaped as described below.

First note that sections C, D and E, taken together, comprise a truly helical portion conforming with the helix desired in the coil of tubing being produced.

Sections A and B, taken together, comprise a straight portion at the leading-in end of the mandrel. It will be noted that the leading-in portion (A plus B) is extended in a direction paralleling the axis of the helical portion, and is offset from the said axis a distance equal to the radius of the helical portion (see Figure 6).

The helical section D is of uniform cross-section throughout its length, conforming with the internal dimensions desired in the tubing of the coil being formed.

Helical section C is tapered in cross-sectional area, with the area of smaller cross-section adjoining the straight leading-in section B.

Section B is also tapered in cross-sectional area, with the area of larger cross-section conforming with the adjoining end of section C, and with the area of smaller cross-section adjoining section A. A progressive taper is therefore provided from the region of the junction of sections A and B to the region of the junction of sections C and D.

Section A is of uniform cross-section throughout its length and comprises the initial leading-in portion.

Section E, which comprises a part of the helical portion, is tapered in cross-sectional area, with the area of small cross-section disposed at the terminal end of the mandrel.

As clearly appears in Figure 6, the tapering leading-in section B is provided by cutting away the outer side of the mandrel, i. e., the side of the mandrel remote from the axis of the helix of the helical portion. This brings the center of portion A closer to said helix axis than the center of the portion of the mandrel at the junction between sections B and C, as is indicated by the eccentricity of the circles to which the letters A and B have been applied in Figure 6. Similarly, the tapering of section C of the mandrel is accomplished by cutting away the outer side of the leading-in end of the helical portion.

The manner of tapering various sections of the mandrel, as described above, is of advantage in facilitating forcing a tube over the mandrel.

While the mandrel described may be used with a tube having an internal diameter equal to or even slightly larger than the diameter of the mandrel at the helical section D, it is preferred to carry out the forming operation starting with a tube which has a slightly smaller diameter than the maximum diameter of the mandrel so that the mandrel actually effects a certain limited expansion of the tube. We have found this expansion to be essential in obtaining the high degree of uniformity of internal diameter and wall thickness which is generally desired in the tube of the finished coil. To illustrate this, and also to illustrate other typical dimensions, the following example is cited.

In the forming of a helical coil having an inside diameter of 2.50", a mandrel was employed in which section D had a diameter of 2.50" and in which the taper in sections C and B brought the diameter at the junction between sections A and B down to 2.312". Seamless tubing, formed of carbon steel of approximately 0.3% carbon corresponding to ASTM specification A—106, Grade B, and having an inside diameter of 2.357" and an outside diameter of 2.625", was forced over the mandrel just described, to thereby produce a helical tube having an inside diameter of 2.50", the feed of the tubing over the mandrel being effected while uniformly heating the tubing, as illustrated in Figure 3.

The length of the mandrel is preferably sufficient to provide a helical portion equal to at least an appreciable fraction of a turn of the helix being formed. In the embodiment illustrated the helical sections D and C make up the equivalent of one-half turn of the helix being formed.

The position of the mandrel with relation to the zone of concentrated heating (see Figure 3) is also desirably such that the mandrel extends appreciably beyond said zone of concentrated heating, to thereby provide for some cooling of the tubing before it actually leaves the mandrel. Stated in another way, the zone of concentrated heating is preferably located intermediate the ends of the mandrel. In the forging of a helical tube in this way, when the method is carried out at elevated temperatures, it is of importance that substantial heating of the tube be attained prior to expansion of the tubing which occurs in the tapered section (B plus C) of the mandrel.

It is further pointed out, however, that with tubing composed of certain metals, for example stainless steels of the austenitic type, alloys containing about 67% nickel and 30% copper known as "Monel," and alloys containing about 78.5% nickel, 14% chromium, and 6.5% iron sold under the trade name "Inconel," fabrication of a helical piece may be accomplished even without heating, the tubing being forced over the mandrel at room temperatures.

As hereinabove mentioned, where heating is employed, as is preferred with certain types of steel tubing, it is advantageous that the tube wall be heated substantially uniformly throughout its circumference, in the zone of concentrated heating, such uniform heating serving to retain uniformity of wall thickness as the tubing is being expended on the tapered portion of the mandrel.

According to the foregoing a method and apparatus are provided for direct forging of a helical coil of tubing having a relatively large ratio of pitch to diameter. Moreover, this is accomplished by the invention in a manner achieving great accuracy as to helical shape, tube diameter and tube wall thickness. The technique described also produces tubing of good quality, free of locked-in stresses.

We claim:

1. For use in making helical coils of tubing, a mandrel over which a tube is adapted to be forced, the mandrel having a portion of helical contour, and an adjoining substantially straight leading-in portion having its axis offset from and substantially parallel to the axis of the helix of the helical portion.

2. A mandrel according to claim 1 in which at least a part of said leading-in portion is tapered in cross-sectional area, with the cross-section of larger area positioned adjacent the adjoining end of the helical portion.

3. A mandrel according to claim 2 in which the center of any cross-sectional area of said tapered leading-in portion is closer to the axis of the helix of the helical portion than is the center of any cross-sectional area of said helical portion.

4. A mandrel according to claim 1 in which a part of the helical portion toward the leading end thereof is of tapered cross-sectional area, with the cross-section of small area adjacent to the adjoining end of the straight leading-in portion.

5. A mandrel according to claim 4 in which at least a part of said straight leading-in portion is tapered in cross-sectional area, with the cross-section thereof of larger area positioned adjacent and conforming with said cross-section of smaller area of the tapered part of the helical portion.

6. A mandrel according to claim 1 in which the straight leading-in portion comprises two parts one of which is tapered in cross-sectional area, with the cross-section of the larger area adjoining the helical portion, and the other part of which is of uniform cross-sectional area conforming with that of the cross-section of smaller area of the tapered part.

7. A mandrel according to claim 1 in which the pitch of the portion of the mandrel of helical contour is at least twice the diameter of the helix of said helical portion.

8. For use in making helical coils of tubing, a mandrel over which a tube is adapted to be forced, at least a portion of the mandrel being of helical contour and at least a part of the helical portion being tapered in cross-sectional area, with the cross-section of smaller area positioned at the leading-in end of the helical portion, and mandrel anchoring means associaed with the leading-in end of the helical portion and adapted for connection with an anchor extended therefrom in the leading direction in a position radially offset from and substantially parallel to the axis of the helix of the helical portion.

9. A mandrel according to claim 8 in which the helical extent of the mandrel is equal to more than one quarter of a turn of the helix being formed.

10. A mandrel according to claim 8 in which the helical portion of the mandrel comprises two parts, one of which is of uniform cross-sectional area and the other of which is of tapered cross-sectional area and is positioned in advance of the first part, with the cross-section of smaller area positioned at the leading-in end of the helical portion of the mandrel.

11. A mandrel according to claim 10 in which the helical extent of each of said parts is equal to about one quarter of a turn of the helix being formed.

12. Apparatus for forging a helical coil of tubing comprising heater means defining a zone of concentrated heating, a helical mandrel anchored with a portion thereof disposed in said zone, mechanism for feeding a tube to and over said mandrel in a direction generally paralleling the axis of the helix of the mandrel, and means for supporting the formed helical coil of tubing in an appreciable length thereof axially of said helix beyond said mandrel.

13. Apparatus for forging helical coils of tubing comprising heater means defining a zone of concentrated heating, a helical mandrel anchored with a portion thereof disposed in said zone, and mechanism for feeding a tube to and over said mandrel in a direction generally paralleling the axis of the helix of said mandrel, the mandrel being helically extended appreciably beyond said zone of concentrated heating.

14. A construction according to claim 13 and further including means for externally supporting the formed helical coil of tubing in an appreciable length thereof axially of said helix beyond said mandrel.

CARL B. McLAUGHLIN.
JOHN D. OCHS.
CHARLES L. REDMON.

REFERENCES CITED

The following references are of record in the file of this patent:

UNITED STATES PATENTS

| Number | Name | Date |
| --- | --- | --- |
| 50,272 | Philbrook | Oct. 3, 1865 |
| 303,952 | Sharp | Aug. 19, 1884 |
| 617,353 | Redmond | Jan. 10, 1899 |
| 746,387 | Schalitz | Dec. 8, 1903 |
| 851,152 | Baldwin | Apr. 23, 1907 |
| 1,056,326 | Diescher | Mar. 18, 1913 |
| 1,353,714 | Bohling | Sept. 21, 1920 |
| 1,958,982 | Wintercorn | May 15, 1934 |
| 2,062,552 | Burgess | Dec. 1, 1936 |
| 2,138,127 | Squires | Nov. 29, 1938 |
| 2,176,961 | Gaum | Oct. 24, 1939 |

FOREIGN PATENTS

| Number | Country | Date |
| --- | --- | --- |
| 445,075 | Germany | June 3, 1927 |
| 472,415 | Germany | Feb. 27, 1927 |